United States Patent
Lu et al.

(10) Patent No.: US 9,344,997 B2
(45) Date of Patent: May 17, 2016

(54) SELECTION OF COMMUNICATION MODE

(75) Inventors: Qianxi Lu, Beijing (CN); Tao Chen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 616 days.

(21) Appl. No.: 13/879,366

(22) PCT Filed: Oct. 13, 2010

(86) PCT No.: PCT/FI2010/050795
§ 371 (c)(1),
(2), (4) Date: May 22, 2013

(87) PCT Pub. No.: WO2012/049351
PCT Pub. Date: Apr. 19, 2012

(65) Prior Publication Data
US 2013/0230032 A1    Sep. 5, 2013

(51) Int. Cl.
*H04W 72/02*    (2009.01)
*H04W 76/02*    (2009.01)
*H04W 72/12*    (2009.01)

(52) U.S. Cl.
CPC ............ *H04W 72/02* (2013.01); *H04W 76/023* (2013.01); *H04W 72/1263* (2013.01)

(58) Field of Classification Search
None
See application file for complete search history.

(56) References Cited

U.S. PATENT DOCUMENTS

| 7,286,842 | B2 | 10/2007 | Li et al. |
| 2006/0245398 | A1 | 11/2006 | Li et al. |
| 2010/0022190 | A1 | 1/2010 | Laroia et al. |
| 2010/0093364 | A1* | 4/2010 | Ribeiro ............... H04W 72/082 455/452.2 |
| 2010/0169498 | A1 | 7/2010 | Palanki et al. |
| 2010/0261469 | A1 | 10/2010 | Ribeiro et al. |
| 2012/0020213 | A1* | 1/2012 | Horneman .......... H04W 76/043 370/231 |

FOREIGN PATENT DOCUMENTS

| CN | 101518121 A | 8/2009 |
| CN | 101689893 A | 3/2010 |
| EP | 1263158 A1 | 12/2002 |
| WO | WO-2010080077 A1 | 7/2010 |

OTHER PUBLICATIONS

Qualcomm Incorporated, Peer-to-Peer Communications in Long Term Evolution System, Apr. 15, 2010, provisional of PG PUB (US 2011/0255450).*
PCT International Search Report dted Jun. 3, 2011 for PCT application No. PCT/FI2010/050795.

* cited by examiner

*Primary Examiner* — Ian N Moore
*Assistant Examiner* — Latresa McCallum
(74) *Attorney, Agent, or Firm* — Mintz Levin Cohn Ferris Glovsky and Popeo, P.C.

(57) ABSTRACT

A method, apparatus, and computer program for selecting a communication mode for a terminal device is described herein. A communication mode is selected for a terminal device on the basis of a difference between an estimated radio channel between the terminal device and a base station and an estimated radio channel between the terminal device and another terminal device. The communication mode is selected from a group comprising a plurality of different configurations to multiplex communication over the first radio link with communication over the second radio link.

25 Claims, 5 Drawing Sheets

Fig 9

SELECTION OF COMMUNICATION MODE

CROSS REFERENCE TO RELATED APPLICATIONS

This application is a national stage application, filed under 35 U.S.C. §371, of PCT Application No. PCT/FI2010/050795, filed on Oct. 13, 2010, the contents of which are incorporated herein by reference in their entirety for all purposes.

FIELD

The invention relates to the field of radio telecommunications and, particularly, to selection of a radio communication mode for a mobile device.

BACKGROUND

Recent studies related to efficient spectrum utilization have considered allocation of direct device-to-device radio connections to a frequency band of a radio access network of a cellular telecommunication system. As a consequence, there exist two types of network scenarios: a cellular network and an ad-hoc network. In the cellular network, a terminal device communicates with another terminal device through the radio access network of the cellular telecommunication system. In the ad-hoc network, the terminal device communicates with the other terminal device directly, e.g. the connection is not routed through the radio access network. When the terminal device operates in a cellular network mode, traffic is typically routed through a centralized controller such as a base station even if a source and a destination terminal device are located close to each other. When the terminal device operates in a device-to-device mode, traffic is typically routed directly from the source terminal device to the target terminal device.

BRIEF DESCRIPTION

According to an aspect of the present invention, there is provided a method as specified in claim 1.

According to another aspect of the present invention, there is provided an apparatus as specified in claim 12.

According to another aspect of the present invention, there is provided an apparatus as specified in claim 25.

According to yet another aspect of the present invention, there is provided a computer program product embodied on a computer readable distribution medium as specified in claim 26.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
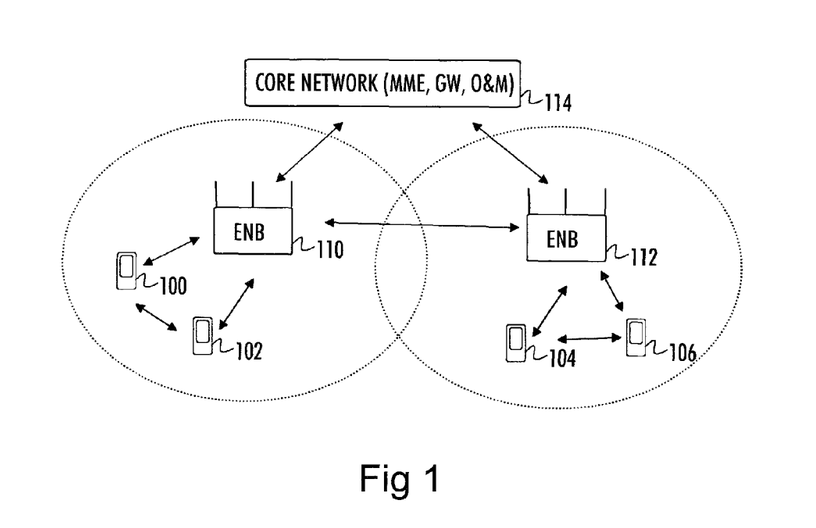
FIG. 1 illustrates an example of communication in a mobile telecommunication system to which embodiments of the invention may be applied.

A general architecture of a cellular telecommunication system providing mobile terminals with voice and data transfer services is illustrated in FIG. 1. The cellular telecommunication system illustrated in FIG. 1 is based on UMTS LTE (Universal Mobile Telecommunication System Long-Term Evolution) specification, but the invention is not limited to that. In some embodiments, the cellular telecommunication system supports other system specifications, e.g. IEEE 802.11x (WiFi), WiMAX (Worldwide Interoperability for Microwave Access), other versions of the UMTS (Wideband Code Division Multiple Access, High-speed Packet Access), GSM (Global System for Mobile Communications) and its extensions (General Packet Radio Service, Enhanced Data Rates for GPRS Evolution), and CDMA2000 and its extensions, e.g. Evolution-Data Optimized. In principle, some embodiments of the invention may be realized in any wireless telecommunication system. FIG. 1 illustrates a radio access network of the cellular telecommunication system comprising base stations 110, 112 serving terminal devices 100, 102 and 104, 106, respectively. In the UMTS LTE system, the base station is denoted by enhanced Node B (eNB). The base stations 110, 112 communicate with the terminal devices 100 to 106 over a radio interface and, additionally, with each other over a wired or wireless connection. In the UMTS LTE, this connection is X2 connection. Furthermore, each base station is connected to a core network 114 of the cellular telecommunication system. The core network may comprise a mobility management entity (MME) controlling operation of the cellular telecommunication system according to mobility of the terminal devices 100 to 106, a gateway node (GW) handling data routing, and an operation and maintenance server (O&M) controlling operating parameters and configurations, e.g. allocation of identifiers, in the radio access network and in the core network.

The cellular telecommunication system is configured to provide the terminal devices 100 to 106 with cellular telecommunication connections connecting the terminal devices to each other and to other networks through the cellular telecommunication system. Additionally, the cellular telecommunication system is configured to support direct device-to-device (D2D) connections between the terminal devices, wherein the D2D connections utilize the frequency spectrum of the cellular telecommunication system. In one embodiment, the D2D connections utilize at least one of downlink and uplink frequency spectrum of the cellular telecommunication system. It should be noted that a D2D connection refers to a connection established over a radio interface between two wireless communication devices such that the D2D connection is not routed through the radio access network of the cellular telecommunication system, e.g. the D2D connection consists the radio link between the two wireless communication devices. As the D2D connection uses the frequency resources of the cellular telecommunication system, a base station of the cellular telecommunication system may control communications over the D2D connection at least partly.

Figure 2:
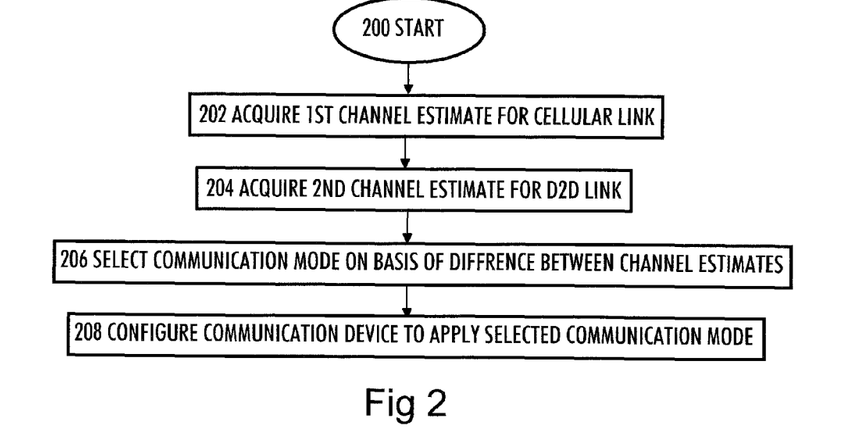
FIG. 2 illustrates a flow diagram of a process for selecting a communication mode for a terminal device according to some embodiments of the invention.

In an embodiment, an apparatus selects a communication mode for a terminal device configured to support a cellular connection and a D2D connection concurrently. FIG. 2 illustrates an exemplary flow diagram of a process or a method for selecting the communication mode for the wireless communication device. The process starts in block 200. In block 202, a first channel estimate related to a first radio link between a base station of a cellular telecommunication system and the terminal device served by the base station is acquired. In block 204, a second channel estimate related to a second radio link between the terminal device and another terminal device is acquired. Then, a difference between the first channel estimate and the second channel estimate is determined and, in block 206, the communication mode of the terminal device is selected on the basis of the determined difference between the first channel estimate and the second channel estimate. The communication mode is selected from a group comprising a plurality of different configurations to multiplex communication over the first radio link with communication over the second radio link. In one embodiment, the group comprises at least the following communication modes: a restricted communication mode and a flexible communication mode. Terms "restricted communication mode" and the "flexible communication mode" are used to merely discriminate the two communication modes from one another. In the restricted communication mode, the terminal device is configured to time-multiplex communications over the first and second radio links and to use time-domain duplexing in the communications over the second radio link. In the flexible communication mode, the terminal device is configured to support both time-multiplexing and frequency-multiplexing of the first and second radio links. In block 208, the terminal device is configured to apply the selected communication mode.

In some embodiments, the process is carried out in an apparatus applicable to the terminal device. The first channel estimate may be computed in the terminal device or, if the serving base station computes the first channel estimate from an uplink pilot signal, the apparatus may receive the first channel estimate from the serving base station through downlink control signaling. The location where the first channel estimate is computed may depend on the duplexing scheme used in the first radio link (cellular link) and/or on whether uplink or downlink frequencies of the base station are used for D2D communications. The second channel estimate may be computed in the terminal device or in the other terminal device and then communicated over the D2D link. In some embodiments utilizing centralized control of the communication mode of the terminal devices, the process is carried out in an apparatus applicable to the base station. Then, the terminal device may compute the second channel estimate and communicate it to the base station through uplink control signaling. The first channel estimate may be computed in the base station or in the terminal device and, in the latter case, communicated to the base station. Generally, the process of FIG. 2 may be carried out by a processor or a controller configured to control the communication mode of the terminal device. The processor or the controller may thus be considered to be an embodiment of an apparatus comprising means for carrying out the method of FIG. 2.

In one embodiment, the communication mode is selected according to the difference between the two channel estimates as follows. If absolute difference between the channel estimates is lower than a determined selection threshold, the flexible communication mode is selected. On the other hand, if the absolute difference between the channel estimates is higher than the selection threshold, the restricted communication mode is selected. In practice, if the radio channels of the first and the second radio link are similar, their transmission powers are also close to each other which means that the simultaneous transmission is determined not to cause intolerable interference between the two links. In such cases, the flexible communication mode, for example simultaneous transmission to the cellular uplink and over the D2D connection may be allowed. On the other hand, if the radio channels of the first and the second radio link are very different, their transmission powers are also very different which means that the simultaneous transmission may cause high interference between the two links. In such cases, the terminal device may be restricted to communicate over only one communication direction at a time. The channel estimates may include a channel path loss which may be computed according to any state-of-the-art path loss estimation scheme.

The value of the selection threshold may be selected according to the capabilities of the terminal device. For example, the selection threshold may be affected by the transmission power capabilities of the terminal device, capability of the terminal device to isolate the two simultaneous transmissions, etc.

Figure 3A:
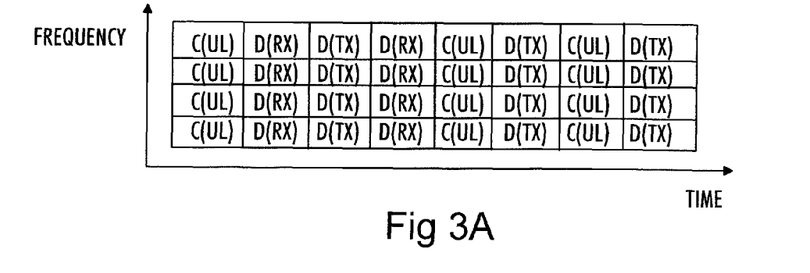
FIGS. 3A and 3B illustrate examples of different communication modes.
Figure 3B:
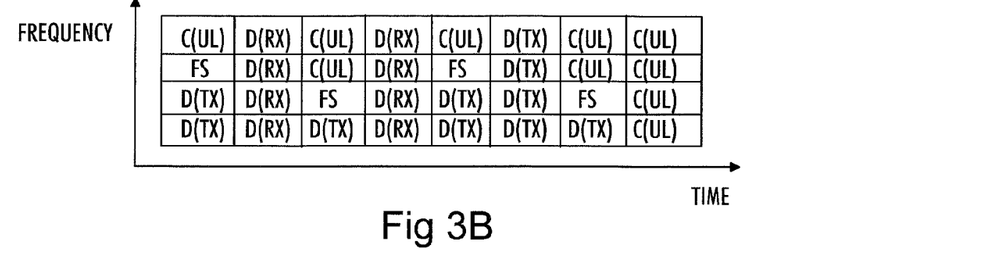

Let us now consider the communication modes in more detail with reference to FIGS. 3A and 3B. FIG. 3A illustrates one embodiment of the restricted communication mode, and FIG. 3B illustrates one embodiment of the flexible communication mode. Let us now consider a situation where the D2D connection uses the cellular uplink frequency resources but the invention is not limited to that. Referring to FIG. 3A, the transmission resources (frequency blocks) are distributed amongst three transmission directions in a pure time-division manner. The three transmission directions from the point of view of the terminal device are cellular uplink C(UL), D2D transmission D(TX), and D2D reception D(RX). The cellular downlink is omitted in this discussion, as it is assumed that the cellular communications utilize frequency-division duplexing (FDD) and that the D2D connection is allocated to the uplink frequency band. In other words, the terminal device communicates only over one of these communication directions at a time in the restricted communication mode. FIG. 3A illustrates a simplified case where the frequency resources used by the terminal device are the same, but it should be noted that in practice different frequency resources may be scheduled to the terminal device at different transmission times. The restricted communication mode still applies as the terminal device communicates over only one communication direction at a time. A guard period may be arranged when changing the communication direction in order to tune the terminal device to the new communication direction and new communication parameters. The cellular and D2D connection may employ a cyclic prefix or a corresponding guard interval which may be sufficient to tune the terminal device, for example in the UMTS LTE a cyclic prefix between consecutive OFDMA (orthogonal frequency division multiple access) symbols is about 5 μs. However, an extra guard interval may be inserted when changing the communication direction, if necessary.

FIG. 3B illustrates one embodiment of the flexible communication mode. In this embodiment, the cellular transmission and the D2D transmissions are frequency-multiplexed, while D2D reception is not allowed to be frequency-multiplexed with another communication direction. The reason for not frequency-multiplexing the D2D reception is that duplex frequency-spacing required to separate the D2D reception from D2D transmission or cellular transmission may be tens or even hundreds of MHz which is usually higher than cellular bandwidth allocated to the base station (1.4 to 20 MHz in the UMTS LTE). In systems with sufficient frequency band for the frequency duplexing of the D2D connection, the frequency-duplexing may result in poor spectral efficiency. However, some embodiments are applicable to systems using the FDD over the D2D connection in which case the D2D reception may also be frequency-multiplexed with other communication directions. In order to reduce inter-frequency interference when frequency-multiplexing two communication directions, a frequency spacing (FS), a guard band, may be allocated between the frequency resources scheduled to the two communication directions for simultaneous utilization. Now, the frequency-spacing is allocated between the cellular uplink and the D2D transmission resources to provide the frequency separation. The frequency spacing may be one or more frequency resource blocks arranged between the transmission resources of the cellular and the D2D link.

Resolution in which the time-domain multiplexing is carried out may be frame or sub-frame level, for example. The resource division rules described above may be applied to dedicated terminal devices, or they may be common to all terminal devices that support the two communication modes in a cell controlled by the base station.

Figure 4:
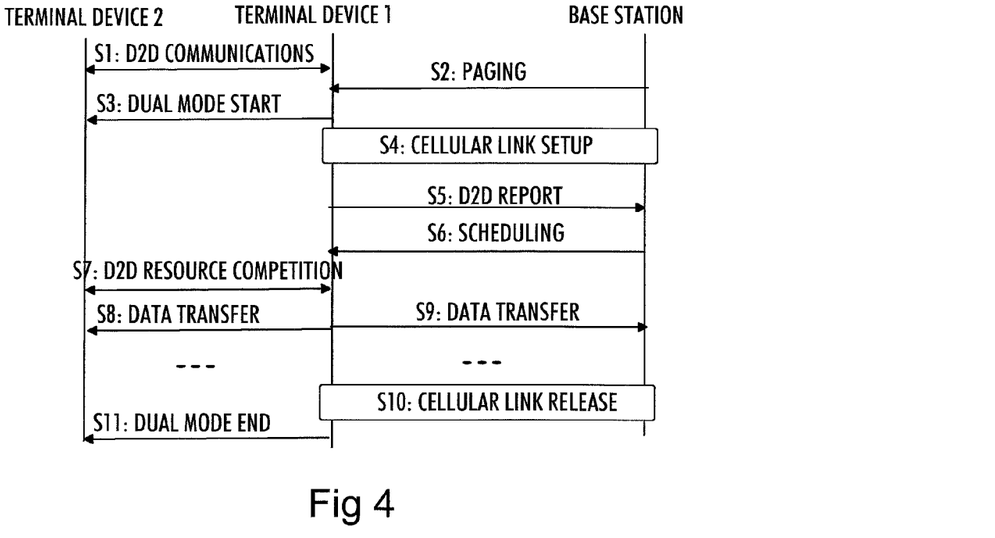
FIG. 4 illustrates a signaling diagram of carrying out communication over a plurality of radio links according to some embodiments of the invention.

FIG. 4 illustrates an exemplary signaling diagram related to a case where a first terminal device has an operating D2D connection with a second terminal device and is about to establish a cellular connection. Such a scenario may exist when a user is playing a game with a friend over the D2D connection and, then, receive a phone call. Referring to FIG. 4, the D2D communications is being carried out in S1, where data is transferred over the D2D connection established between two terminal devices. A serving base station may control the D2D connection by scheduling resources to the D2D connection. In S2, the first terminal device receives a paging request from the serving base station. In response to the reception of the paging request, the first terminal device may inform the second terminal device about the cellular connection being established by transmitting a control message to the second terminal device in S3. The control message may include a notification to protect defined communication resources from D2D utilization so that the first terminal device may carry out appropriate random access and radio resource connection (RRC) setup procedures with the base station. The cellular link setup is carried out in S4 where the first terminal device carries out the random access procedure and establishes the RRC connection with the base station for the RRC of the cellular link. During the execution of S4, the first terminal device may reserve some available transmission resources for the D2D connection to ensure traffic continuity in the D2D connection. The resources may be reserved by transmitting a unique preamble sequence indicating the reserved resources, or the reserved resources may be indicated implicitly by a frequency resource in which a physical random access channel (PRACH) is transmitted. The reserved frequency resources may be a frequency block or blocks in which the PRACH was transmitted by the first terminal device. In one embodiment, the D2D connection is put on a stand-by state for the duration of the execution of the S4. In this embodiment, modification to the existing system may not be needed. The cellular setup in S4 may comprise the selection of the communication mode, and channel estimates needed for making the selection may be computed and transferred accordingly.

In S5, the first terminal device transmits a report about the D2D connection to the base station. The report may include parameters of the D2D connection, e.g. quality-of-service parameters, buffer status for the D2D link, and any other information related to traffic status of the D2D link. The report may also comprise time-division duplexing (TDD) parameters of the D2D connection. The TDD parameters and the other parameters included in the report may be semi-static parameters, so repeated transmission of the D2D report is not necessary. The base station may use the information in order to reserve sufficient amount of resources for the D2D connection. The base station may consider the traffic ratios and the QoS requirements of the D2D connection (based on the D2D report transmitted in S5) and the cellular connection (obtained through conventional means for determining the traffic requirements for the cellular connection) in order to decide the allocated resource ratio between D2D and cellular mode.

In S6, the base station schedules resources for the cellular connection by using the above-mentioned information on the requirements of the D2D connection and the cellular connection, for example, and transmits an uplink scheduling grant message to the first terminal device on a physical downlink control channel (PDCCH), the message comprising the scheduling information. The first terminal device (and the second terminal device receiving the same message) may determine from the message available resources for the D2D connection and, then, negotiate D2D resource allocation or competition in S7. Let us now assume that the flexible communication mode is selected for the first terminal device, and the D2D resource competition results in that the first terminal device is configured to carry out transmission over the D2D connection simultaneously with cellular uplink transmission. In S8, the first terminal device carries out transmission over the D2D link by using determined frequency resources and, simultaneously in S9, the first terminal device carries out cellular uplink transmission by using the frequency resources scheduled to it in S6 (other frequency resources than those used in S8). In this manner, steps S6 to S9 may be repeated while the cellular link is operational. Naturally, the D2D connection may be bidirectional connection, and the second terminal device also carries out transmissions to the first terminal device at appropriate transmission time instants. In S10, the cellular link is released as a consequence of terminated connection. In S11 and in response to the release of the cellular link, the first terminal device may transmit a control message to the second terminal device, thereby indicating the release of the cellular link. Thereafter, the terminal devices may continue the D2D connection as in S1, where both terminal devices operate only the D2D connection.

The embodiment of FIG. 4 considers operation where the base station first schedules resources for the cellular link, and the D2D resource competition in S7 is applied to remaining resources. In that embodiment, the base station may schedule the cellular resources without using any knowledge about how the D2D connection is to be scheduled. Thereafter, the terminal devices may schedule the resources to the D2D connection by using the resources left available. When the terminal devices schedule the D2D resources, the available resource that may be scheduled to the D2D connection may comprise any other resources than already scheduled to the cellular uplink transmission. When the base station schedules the D2D resources as well, the base station may schedule to the D2D connection resources that are orthogonal to those resources that are already scheduled to any terminal device in the cell. In another embodiment, the base station may support reused cellular resources, e.g. schedule the same (time-frequency) resources to a plurality of terminal devices when the base station determines that mutual interference is sustainable. When making such a decision, the base station may use channel estimates and D2D reports to determine those terminal devices that are sufficiently far away from each other so that resource reuse may be used.

In some embodiments where the flexible communication mode is in use, the first terminal device may utilize the transmission time instants the base station scheduled for uplink cellular transmission to D2D transmission by using the frequency-multiplexing. On the other hand, the D2D reception of the first terminal device may be scheduled to transmission time instants where the first terminal device does not carry out uplink cellular transmission. In some embodiments, S7 is carried out before S6, and the first terminal device reports to the base station the resources proposed for scheduling to the D2D link. Then, the base station, allocates the PDCCH uplink scheduling grant according to the communication mode selected for the first terminal device such that communication mode of FIG. 3A or 3B is realized. For example, if the first terminal device is proposed to receive at a given transmission time instant, the base station may attempt to not schedule cellular uplink transmission to that transmission time instant.

Furthermore, although the embodiment of FIG. 4 considers a case where only the first terminal device uses the selected communication mode, e.g. the flexible communication mode, it can be extended to the case where the similar scheme is applied to both devices. In some embodiments, such a scheme where both terminal devices apply dual communication link (D2D and cellular) may be supported only when the terminal devices are served by the same cell. Such a requirement may be feasible because of synchronization requirements of the cellular and D2D connection. In a scenario where the two devices are served by neighboring or different cells and where the two cells are not synchronized, the terminal devices may be divided into master and slave device, and the cellular traffic of the slave device may be forwarded to the radio access network by employing cellular link over D2D relaying through the master device.

Figure 5A:
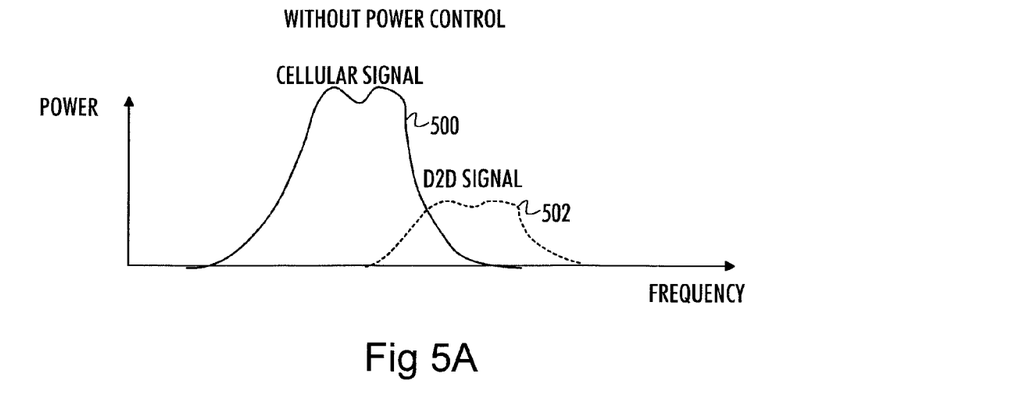
FIGS. 5A and 5B illustrate examples of frequency spectra of two signals allocated to neighboring frequencies.

As described above in connection with FIG. 3B, the flexible communication mode frequency-multiplexes the cellular and D2D link transmissions. Typically, the path losses (or similar metrics proportional to the distance of the radio links) are different between the cellular and the D2D links. In many situations, the path loss of the D2D link is smaller than that of the cellular link, because the terminal devices of the D2D link are closer to each other than to the serving base station. There may, however, be situations where the path loss of the cellular link is smaller than that of the D2D link, for example, when one of the terminal devices of the D2D link are close to the serving base station, e.g. in a cellular hot-spots. The difference in the channel estimates results in a proportional difference in transmission powers. In such a case where one of the transmission powers of the two links is higher than the other, there is a possibility for that the link requiring stronger transmission power interferes the other link and, therefore, degrades the quality of the other link. FIG. 5A illustrates an exemplary scheme where a cellular transmission 500 and a D2D transmission 502 are allocated to neighboring frequency bands, and the cellular transmission requires higher transmission power. As can be seen in FIG. 5A, sidelobes of the spectra of the two signals overlap and, as a stronger signal, a cellular signal interferes with a D2D signal more than the D2D signal interferes the cellular signal. Appropriate selection of a value for the above-mentioned selection threshold prevents the frequency-multiplexing of the two connections when the channel estimate difference is high. However, because of additional flexibility provided by the frequency-multiplexing, the frequency-multiplexing even may be used when the channel estimates and transmit powers of the two links differ from one another. The frequency-spacing mentioned in connection with FIG. 3B may be used to reduce the effect of the inter-frequency interference, but it may result in sub-optimal spectral efficiency, as there are unused frequency blocks in the frequency spectrum.

Figure 5B:
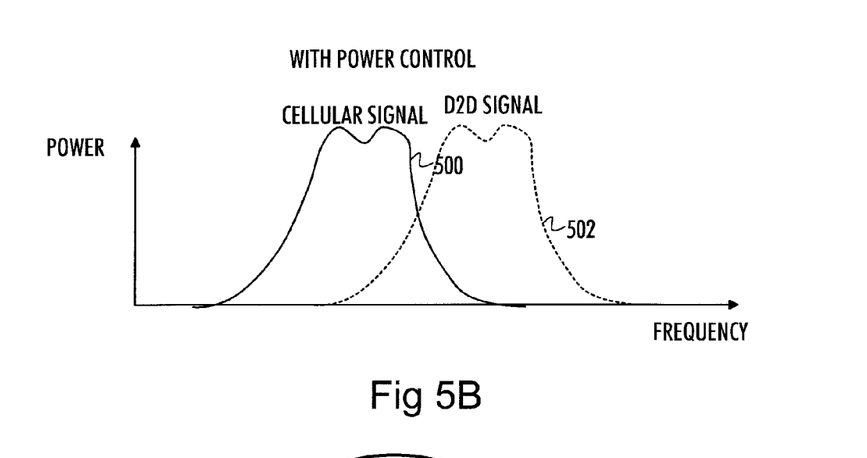

Some embodiments of the invention address this issue by providing a power control scheme which reduces the inter-frequency interference by adjusting the transmission powers of the two connections and the frequency spacing in a joint optimization process. One embodiment of the power control scheme optimizes the frequency spacing by balancing the transmission powers, resulting in equalized transmission powers shown as an example in FIG. 5B. With the transmission powers equalized, the mutual inter-frequency interference is reduced. Another embodiment optimizes the power consumption and radio interference in the air interface by adjusting the frequency spacing. Such embodiments are described below with reference to FIGS. 6 and 7. The power control process may be carried out after the selection of the communication mode, or it may be carried out before the selection of the communication mode. In the latter case, the transmission powers and the frequency spacing obtained with the power control process may be used as an input parameter in the selection of the communication mode.

Figure 6:
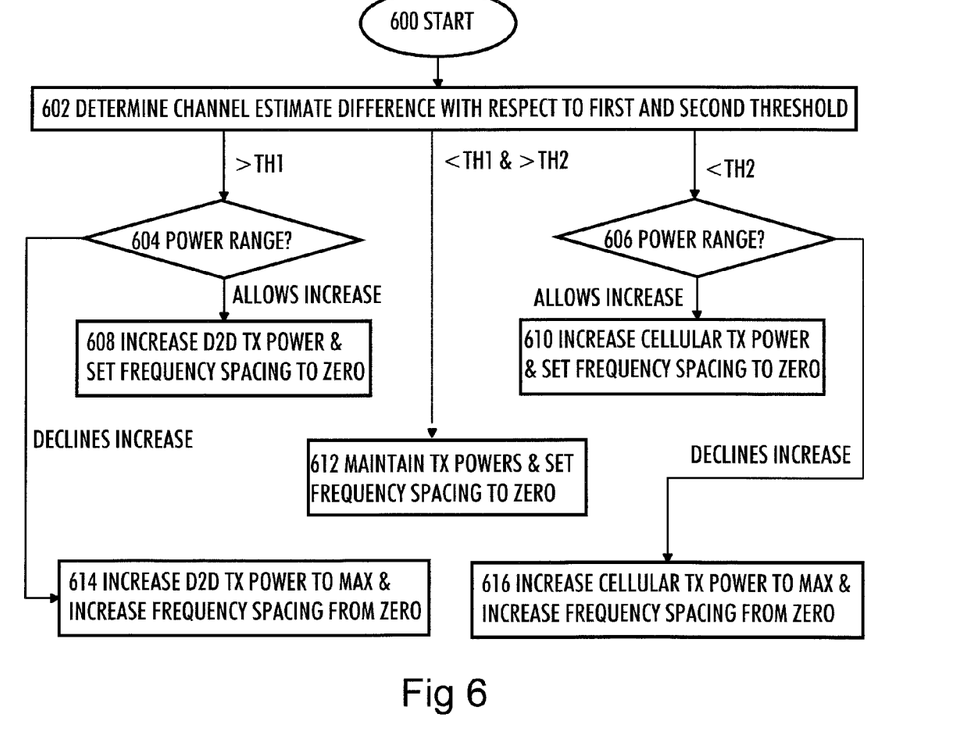
FIGS. 6 and 7 illustrates flow diagrams of processes for determining transmission powers and a frequency spacing jointly according to some embodiments of the invention.

FIG. 6 illustrates a flow diagram of a process for joint computation of the frequency spacing and the transmission powers according to one embodiment. The process is carried so as to determine the transmission power and the frequency spacing for a terminal device communicating over the cellular link and the D2D link. The process may be carried out in connection with the establishment of a second radio link to be operated concurrently with a current radio link, e.g. when the establishment of the cellular link is triggered as described above with reference to FIG. 4. Another triggering event for launching the process is the selection of the flexible communication mode.

The process starts in block 600. The power control process may utilize the channel estimates used in the selection of the communication mode. In block 602, the difference between the channel estimates is analyzed with respect to at least one of a first threshold TH1 and a second threshold TH2. The first threshold and the second threshold may have values both lower than the above-mentioned selection threshold. The first threshold has a value greater than the value of the second threshold. Therefore, it may be sufficient to compare the difference between the channel estimates with respect to only one threshold, as if the difference is higher than a value of the first threshold, the difference is inherently also higher than a value of the second threshold. Similarly, if the difference is smaller than the value of the second threshold, the difference is inherently also smaller than the value of the first threshold. On the basis of the difference with respect to the thresholds, the process proceeds to one of the blocks 604, 606, 612. The channel estimate difference may in this case be signed so as to enable the determination which one of the channel estimates is higher.

If the difference is higher than the first threshold, thereby indicating that the cellular link requires significantly higher transmission power than the D2D link, the process proceeds to block 604 where available power range or power margin of the terminal device for the D2D connection is evaluated. The terminal device may have a determined maximum transmission power which may comprise a link-specific maximum transmission power and/or a device-specific aggregated maximum transmission power value. The evaluation may comprise checking whether or not there are available transmission power resources to increase the transmission power of the D2D link beyond to what is needed to overcome the path loss. This may be understood as checking if there is available transmission power margin. If it is possible to increase the transmission power of the D2D link so as to balance the transmission power of the D2D link with the transmission power of the cellular link, the process proceeds to block 608 in which the transmission power of the D2D link is increased and the frequency spacing is set to zero, and the cellular transmission resources and the D2D transmission resources are allocated to adjacent frequency bands. In some embodiments, block 608 also comprises decreasing the transmission power of the cellular link in order to balance the transmission powers, when it is possible to increase the transmission power of the D2D link but not sufficiently to balance the transmission powers and to avoid the degradation caused by the inter-frequency interference. There may be another margin for the decrease of the transmission power, because arbitrary decrease of the transmission power results in the degradation of the cellular link.

On the other hand, if the transmission power margin of the terminal device does not allow increase of the transmission power of the D2D link such that the transmission powers become balanced, the process proceeds from block 604 to block 614 where the transmission power of the D2D link is increased to a maximum allowed by the transmission power margin, and the frequency spacing is increased from zero in proportion to the transmission power difference between the transmission power of the cellular link and the increased maximum power of the D2D link. There may be a database storing inter-linked values for the transmission power differences and corresponding frequency spacings, and these values and their links may be determined on the basis of measurements etc. Table 1 below shows an example of such a database. A resource block referred to in Table 1 may be a frequency resource block having a determined bandwidth. The resource block may refer to resource blocks of the UMTS LTE system, for example.

TABLE 1

| Tx Power difference | Frequency Spacing |
|---|---|
| <2 dB | 1 resource block |
| 2 to 4 dB | 2 resource blocks |
| 4 to 6 dB | 3 resource blocks |
| . . . | . . . |

If the channel estimate difference is lower than the first threshold but higher than the second threshold, thereby indicating that neither link requires significantly higher transmission power than the other (more than that defined by the range between the thresholds), the process proceeds from block 602 to block 612 where the transmission powers of both links are maintained, and the frequency spacing is set to zero.

If the difference is lower than the second threshold, thereby indicating that the D2D link requires significantly higher transmission power than the cellular link, the process proceeds to block 606 where available power range of the terminal device for the cellular connection is evaluated. The terminal device may have a determined maximum transmission power which may comprise a link-specific maximum transmission power (set by power control carried out by the serving base station) and/or a device-specific aggregated maximum transmission power value. The evaluation may comprise checking whether or not there are available transmission power resources to increase the transmission power of the cellular link beyond to what is needed to overcome the path loss of the cellular link. If it is possible to increase the transmission power of the cellular link so as to balance the transmission power of the D2D link with the transmission power of the cellular link, the process proceeds to block 610 in which the transmission power of the cellular link is increased and the frequency spacing is set to zero. In some embodiments, block 610 also comprises decreasing the transmission power of the D2D link in order to balance the transmission powers, when it is possible to increase the transmission power of the cellular link but not sufficiently to balance the transmission powers and to avoid the degradation caused by the inter-frequency interference. There may be another margin for the decrease of the transmission power of the D2D, because arbitrary decrease of the transmission power results in the degradation of the D2D link.

On the other hand, if the transmission power margin of the terminal device do not allow increase of the transmission power of the cellular link such that the transmission powers become balanced, the process proceeds from block 606 to block 616 where the transmission power of the cellular link is increased to a maximum allowed by the transmission power margin, and the frequency spacing is increased from zero in proportion to the transmission power difference between the transmission power of the D2D link and the increased maximum power of the cellular link. There may be a database storing inter-linked values for the transmission power differences and corresponding frequency spacings, e.g. Table 1, and these values and their links may be determined on the basis of measurements etc. When the channel estimate difference equals to one of the threshold values, it is a matter of design which one of the possible blocks the process chooses (604 or 612 for the first threshold and 606 or 612 for the second threshold).

Figure 7:
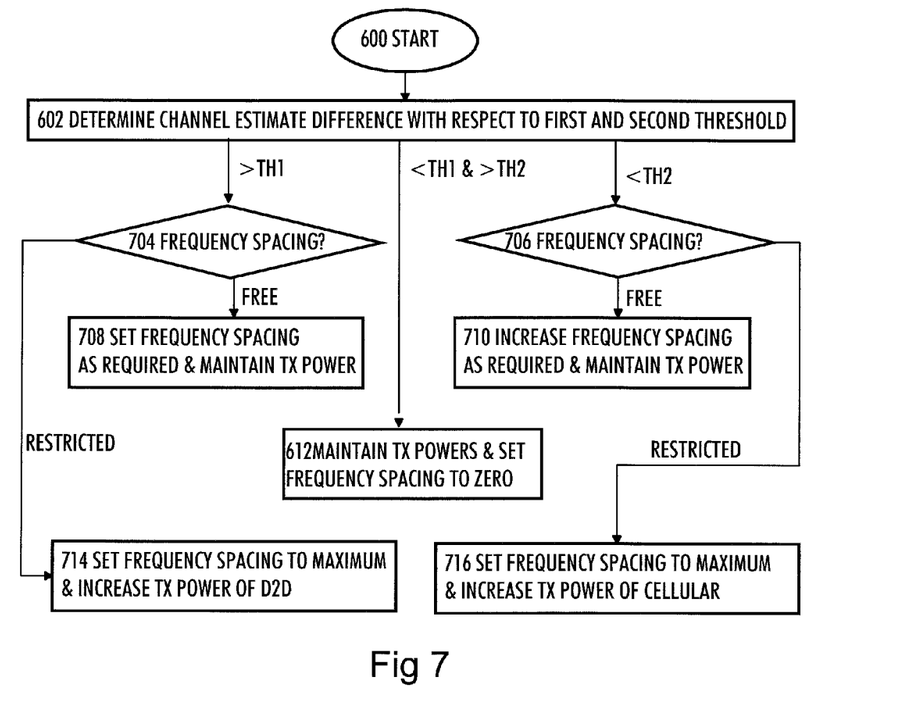

Embodiments based on FIG. 6 aim to set the frequency setting to zero and increase the frequency spacing when the transmission power margin limits the increase of the transmission power. As a consequence, the embodiments optimize primarily the spectral efficiency. FIG. 7 illustrates an example of some other embodiments where the aim is to primarily maintain the transmission powers with the expense of increased frequency spacing. In FIG. 7, blocks denoted with the same reference numbers as used in FIG. 6 refer to similar operations. As a consequence, the channel estimate difference is analyzed in block 602, and the process proceeds to block 704, 706, or 612 according to the result of block 602.

If the channel estimate difference is higher than the first threshold, thereby indicating that the path loss (or a corresponding channel estimate metric) of the cellular link is higher and, thus, requires a higher transmission power setting, the process proceeds from block 602 to block 704 where available frequency spacings are checked. In block 704, a minimum frequency spacing required to overcome the inter-frequency interference may also be checked. When checking the required frequency spacing, a database mapping transmission power differences to minimum frequency spacings (see Table 1 for example) may be used to obtain the minimum frequency spacing. If it is possible to allocate the D2D link and the cellular link to frequency resources separated at least by the minimum frequency spacing, the process proceeds to block 708 where the frequency spacing is set as required and the transmission powers are maintained. If the process is carried out in the base station, the allocation of the frequency resources may be carried out jointly by the base station. If the terminal device carries out the process, the terminal device may allocate the D2D resources according to the scheduling information received from the base station (to the same transmission time instant) and the minimum frequency spacing.

On the other hand, if it is not possible to allocate the frequency resources of the cellular link and the D2D link sufficiently apart from each other in the frequency domain in the same transmission time instant, the process proceeds to block 714 where the frequency spacing is set to maximum available, and the transmission power of the D2D link is increased in proportion to the realized frequency spacing. As was the case in the previous embodiment, there may be a database storing inter-linked values for the transmission powers and corresponding frequency spacings, and these values and their links may be determined on the basis of measurements etc. Thus, the appropriate transmission power may be determined for the applied frequency spacing, provided that there is sufficient transmission power margin.

If the channel estimate difference is lower than the first threshold TH1 but higher than the second threshold TH2, thereby indicating that neither link requires significantly higher transmission power than the other, the process proceeds from block 602 to block 612 where the transmission powers of both links are maintained, and the frequency spacing is set to zero.

If the difference is lower than the second threshold, thereby indicating that the D2D link requires significantly higher transmission power than the cellular link, the process proceeds to block 706 where available frequency spacings are checked. In block 706, a minimum frequency spacing required to overcome the inter-frequency interference may also be checked. When checking the required frequency spacing, the database mapping transmission power differences to minimum frequency spacings (Table 1 for example) may be used to obtain the minimum frequency spacing. If it is possible to allocate the D2D link and the cellular link to frequency resources separated at least by the minimum frequency spacing, the process proceeds to block 710 where the frequency spacing is set as required and the transmission powers are maintained.

On the other hand, if it is not possible to allocate the frequency resources of the cellular link and the D2D link sufficiently apart from each other in the frequency domain in the same transmission time instant, the process proceeds to block 716 where the frequency spacing is set to maximum available, and the transmission power of the cellular link is increased in proportion to the realized frequency spacing. As was the case in the previous embodiment, there may be a database storing inter-linked values for the transmission powers and corresponding frequency spacings, and these values and their links may be determined on the basis of measurements etc. Thus, the appropriate transmission power may be determined for the applied frequency spacing, provided that there is sufficient transmission power margin.

Basically, the power control scheme is independent of the selection of the communication mode. Therefore, it can be seen that the power control scheme may be applied to any scenario where a terminal device operates two radio links that are allocated to transmit simultaneously by using orthogonal frequency resources. Then, one embodiment of the present invention comprises a method for determining transmission parameters for simultaneous transmission over a plurality of radio links from a terminal device. The method may be carried out by an apparatus according to one embodiment of the invention. The plurality of radio links comprise a first radio link which may be the above-mentioned cellular link, and a second radio link which may the above-mentioned D2D link. Let us assume that the terminal device is scheduled to transmit concurrently over the first and second radio links. The method comprises determining transmission powers for the first radio link and/or the second radio link and a frequency spacing between the frequency resources allocated to the first radio link and the second radio link in the joint optimization process, comprising: determining channel estimates for the first radio link and the second radio link; determining a difference between the determined channel estimates, wherein the difference between the channel estimates is an indicator for mutual interference between the radio link, as described above (the lower channel estimate requires higher transmission power, thereby causing more interference to the other link); and selecting the transmission powers and the frequency spacing on the basis of predetermined mappings between the calculated channel estimate difference and allowed transmission power and frequency spacing configurations such that the interference between the radio links is reduced. The reduction is with respect to the situation where the transmission powers are determined on the basis of the channel estimates and the frequency spacing is zero, and the radio links use adjacent frequency resources. Thereafter, the apparatus configures the terminal device to apply the determined transmission powers and the frequency spacing in the concurrent transmission over the first radio link and the second radio link. The predetermined mappings may include different combinations of transmission powers and frequency spacings that are applicable to the channel estimate difference, and the process may select a combination of transmission powers and the frequency spacing that is applicable and that is also available for scheduling (e.g. the frequency resources with the allowed frequency spacing are available). In one embodiment, the process selects a combination that provides the smallest increase to an aggregate transmission power (compared with a scenario where the aggregate transmit power is determined individually and independently for each radio link, e.g. on the basis of the channel estimates) and the smallest frequency spacing. In some other embodiments, the process selects a combination that maximizes the balance between the transmission powers of the first and second radio link and minimizes the frequency spacing. In both cases, when both the transmission powers and the frequency spacing cannot be optimized as desired, the optimization may be carried out according to the process of FIG. 6 or 7, depending on whether the process optimizes the transmission power or the frequency spacing.

As mentioned above, the power control scheme may be carried out in an apparatus applicable to the terminal device or to the base station. Depending on whether the power control scheme is carried out in the terminal device or in the base station (or in another element of a radio access network of the cellular telecommunication system), new signaling arrangements may be applied. Let us first consider a case where the terminal device carries out the power control scheme so as to determine the transmission powers for the D2D and the cellular links and the frequency spacing. In this case, the terminal device may acquire the channel estimates by computing them or by receiving them as channel quality indicators from the other terminal device and/or from the base station. The terminal device may also receive the transmission power margin for the cellular link as a conventional control signaling, and the total maximum transmission power margin (defined by the transmission power capability of the terminal device) internally, e.g. by reading a maximum aggregate transmission power from a memory. In this embodiment, conventional signaling techniques may be utilized to convey the necessary control information to the terminal device. When the base station carries out the power control scheme so as to determine the transmission powers for the D2D and the cellular links and the frequency spacing for the terminal device, the apparatus carrying out the power control scheme in the base station may be configured to receive the channel estimates and the aggregate transmission power margin of the terminal device via uplink control signaling of the cellular link. The channel estimates may be transmitted through Layer 1 (physical layer) control signaling in an uplink control channel field similar to channel quality indicator used in the UMTS LTE system, for example. The transmission power margin of the terminal device may be acquired through Layer 2 (link layer) signaling in an uplink control channel field similar to Power Head Room report (PHR) used in the UMTS LTE. The results of the power control scheme, e.g. at least one of the transmission power of the cellular link, the transmission power of the D2D link, and the frequency spacing may be transmitted to the terminal device as a power control command and a frequency spacing command through Layer 1 downlink control signaling. The transmission power command may be transmitted in a downlink control channel field, e.g. a power control command field of a physical downlink control channel (PDCCH), in a manner similar to transmitting a conventional power control command in the UMTS LTE system. With respect to the frequency spacing command, the frequency spacing command may be transmitted in a frequency spacing field comprised as a part of Layer 1 resource scheduling command on the PDCCH, for example. However the frequency spacing command may be transmitted through another downlink control channel signaling. The frequency spacing command may be transmitted as a dedicated control signaling. In some other embodiments, the frequency spacing or the transmission powers may be instructed implicitly by providing a mapping table (e.g. Table 1) in the terminal device, the mapping table linking transmission power differences to the frequency spacings, as Table 1 does. In such embodiments, only one of the transmission power command and the frequency spacing command is transmitted via downlink control signaling, and the terminal device is configured to determine the command that was not received from the mapping table. For example, when the base station provides the terminal device with only the transmission power command indicating the transmission powers for the D2D link and the cellular link (may be provided through separate transmission power commands), the terminal device may autonomously determine the frequency spacing associated with the provided transmission power commands by referring to the mapping table. In another example where the base station provides the frequency spacing and the transmission power control command for the cellular link, the terminal device may determine the transmission power for the D2D link by referring to the mapping table. In this embodiment, the base station may also provide an additional indicator, e.g. an additional bit that indicates which one of the cellular link and the D2D link is to be transmitted with a higher transmission power. The terminal device may then set the transmission powers of the cellular link and the D2D link according to the power difference as provided in the mapping table and the indicator that defines which one of the links is to be transmitted with a higher transmission power. The base station may provide the terminal device with the mapping table in a static or semi-static manner through radio resource control (RRC) signaling, for example.

One embodiment of an apparatus applicable to a base station is configured to execute a method for selecting the transmission power and the frequency spacing for a terminal device. The method comprises acquiring a first channel estimate related to a first radio link between the base station and the terminal device; acquiring a second channel estimate related to a second radio link between the terminal device and another terminal device; and acquiring a transmission power figure of the terminal device, the transmission power figure indicating transmission power capabilities of the terminal device. The method further comprises determining the transmission powers for the first radio link and the second radio link and a frequency spacing to separate the frequency resources of the first radio link and the second radio link in the flexible communication mode in the joint estimation process according to any above-described embodiment. The method further comprises causing transmission of at least one of the resulting transmission powers (or other information from which the transmission powers may be deduced) and the frequency spacing to the terminal device through downlink control signaling over a downlink control channel of the cellular link. Some embodiments for transmitting the results of the power control scheme to the terminal device have been described above.

One embodiment of an apparatus applicable to the terminal device is configured to execute a method for determining the transmission powers and the frequency spacing for transmission over the cellular link and the D2D link. In the method, the apparatus is configured to cause transmission of the above-mentioned second channel estimate related to the second radio link between the terminal device and another terminal device to the base station. The apparatus is further configured to receive at least one of the following: the transmission powers for the cellular link and the D2D link (or other information from which the transmission powers may be deduced), and the frequency spacing from the base station through the downlink control signaling over the downlink control channel of the cellular link. The apparatus is further configured to determine the transmission powers for the cellular link and the D2D link and the frequency spacing from the received through the downlink control signaling.

One embodiment of the invention relates to a telecommunication signal comprising any one of the above-mentioned fields arranged to carry any one of the transmission power margin of the terminal device, the channel estimate(s), the transmission power control command(s), and the frequency spacing. The telecommunication signal may be an uplink control signal for the transmission power margin of the terminal device and the channel estimate(s), or a downlink control signal for the channel estimate, the transmission power control command(s), and the frequency spacing.

Similarly, depending on whether the selection of the communication mode is carried out in the terminal device or in the base station (or in another element of a radio access network of the cellular telecommunication system), new signaling arrangements may be applied. When an apparatus comprised in the terminal device carries out the selection of the communication mode, the apparatus may be configured to determine frequency spacing through the power control scheme carried out in the terminal device, from the frequency spacing command received from the base station, or from the received transmission power command(s), as described above. Then, when the apparatus selects the flexible communication mode, the apparatus is configured to cause the scheduling of the D2D resources according to the flexible communication mode, the cellular scheduling command received from the base station, and the determined frequency spacing. When an apparatus comprised in the base station carries out the selection of the communication mode, the scheduling of resources to the cellular link and the D2D link may also be carried out in the base station. Then, the power control scheme may also be carried out in the base station so as to avoid the necessity of transmitting the frequency spacing through uplink control signaling. The apparatus comprised in the base station may then select the communication mode and indicate the selected communication mode to the terminal device through scheduled resources. If the base station schedules resources to the terminal device for concurrent cellular link and the D2D link transmission, the scheduling implies the selection of the flexible communication mode. On the other hand, if the scheduled resources are allocated to different transmission time intervals with no frequency multiplexing, the scheduling implies the selection of the restricted communication mode.

Figure 8:
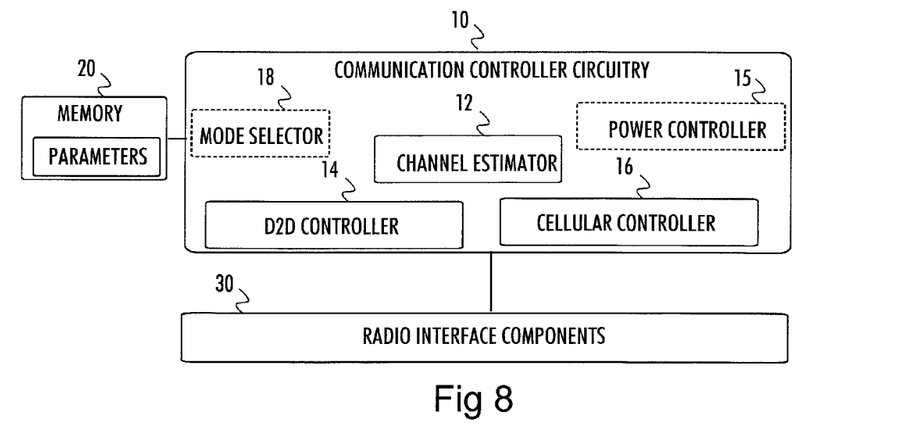
FIGS. 8 and 9 illustrate examples of apparatuses according to some embodiments of the invention.

FIG. 8 illustrates one embodiment of an apparatus applicable to a terminal device configured to support D2D and cellular connections, for example. In some embodiments, the apparatus of FIG. 8 may be the terminal device. The apparatus may comprise a communication controller circuitry 10 configured to control cellular radio connections and the D2D connections in the terminal device. The communication controller circuitry 10 may comprise D2D controller circuitry 14 configured to control the communications over the D2D link. The D2D controller may be configured to determine the communication resources for the D2D connection on the basis of scheduled cellular communication resources determined from a scheduling message received from a serving base station. The communication controller circuitry 10 may further comprises a cellular controller circuitry 16 configured to control the cellular connection by acting as a terminal device of the cellular telecommunication system. In practice, the cellular controller circuitry 16 controls the communication over the cellular link according to communication parameters received from the base station. The communication controller circuitry 10 may further comprise a channel estimator circuitry 12 configured to estimate a radio channel of at least one of the D2D link and the cellular link. Depending on where the selection of the communication mode and/or the power control scheme is made, the cellular controller and/or the D2D controller circuitries are configured to transmit the channel estimate(s) to the serving base station and/or to another terminal device. The communication controller circuitry may also comprise a communication mode selection circuitry 18 configured to carry out the selection of the communication mode, as described above, if it is determined that the terminal device may select its communication mode. When the terminal device is configured to carry out the above-described power control scheme, the communication controller circuitry 10 may comprise a power control circuitry 15 configured to carry out the selection of the transmission powers and the frequency spacing. The power control circuitry 15 may determine the transmission power margins for the radio links from a power received from a base station (for the cellular link) and/or from the power resources of the terminal device. In some embodiments, the power control circuitry 15 is configured to carry out the power control scheme according to any above-described embodiments applicable to the terminal device. The circuitries 10 to 16 of the communication controller circuitry 10 may be carried out by the one or more physical circuitries or processors. In practice, the different circuitries may be realized by different computer program modules.

The apparatus may further comprise one or more memories 20 storing computer programs configuring the apparatus to perform the above-described functionalities of the terminal device. The memory 20 may also store communication parameters and other information needed for the cellular connections. The parameters and the other information may comprise the above-mentioned database(s), channel estimates, etc. The apparatus may further comprise radio interface components 30 providing the apparatus with radio communication capabilities with the radio access network. The radio interface components 30 may comprise standard well-known components such as amplifier, filter, frequency-converter, (de)modulator, and encoder/decoder circuitries and one or more antennas. The apparatus may further comprise user interface comprising a display, an input device (a keypad or a keyboard), an audio output device, etc., and the data traffic may be transmitted to the cellular link and/or to the D2D link in response to commands received from a user through the user interface. Similarly, data received through the cellular link and/or through the D2D link may be displayed to the user through the user interface.

In some embodiments, the apparatus carrying out the embodiments of the invention in the terminal device, for example, comprises at least one processor and at least one memory including a computer program code, wherein the at least one memory and the computer program code are configured, with the at least one processor, to cause the apparatus to carry out the steps of any one of the processes of FIGS. 2 6, and 7 or any other embodiment described above that is carried out in the terminal device. In further embodiments, the at least one memory and the computer program code are configured, with the at least one processor, to cause the apparatus to carry out any one of the embodiments related to the selection of the communication mode and/or the power control scheme(s). Accordingly, the at least one processor, the memory, and the computer program code form processing means to carry out embodiments of the present invention in the terminal device.

Figure 9:
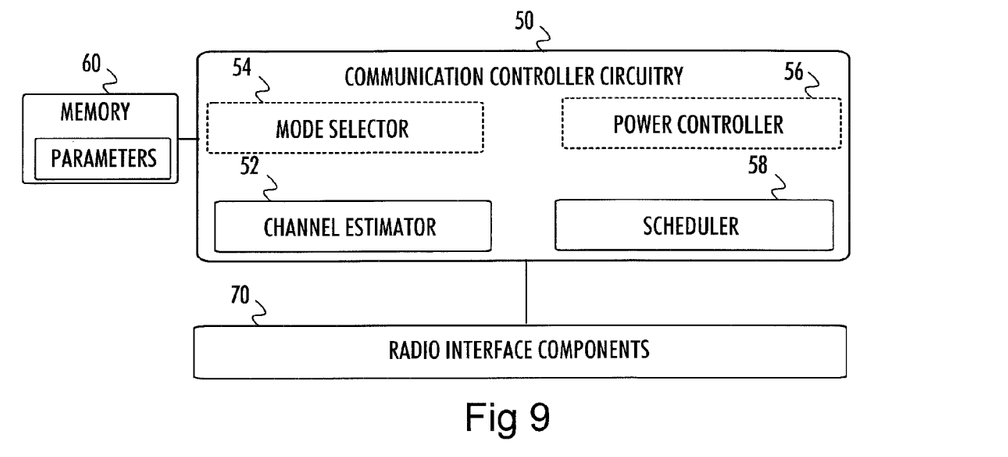

FIG. 9 illustrates one embodiment of an apparatus applicable to a base station configured to support D2D and cellular connections in its coverage area and on its frequency resources, for example. In some embodiments, the apparatus of FIG. 8 may be the base station. The apparatus may comprise a communication controller circuitry 50 configured to control cellular radio connections and, optionally, the D2D connections. The communication controller circuitry 50 may comprise a scheduler 58 configured to schedule the uplink and downlink transmissions over at least the cellular link. The scheduler may also schedule the transmissions of D2D links in the cell controlled by the base station. The communication controller circuitry 50 may further comprise a channel estimator circuitry 52 configured to estimate an uplink radio channel of the cellular link. Depending on where the selection of the communication mode and/or the power control scheme is made, the communication controller circuitry 10 is configured to transmit the channel estimate to a terminal device in question. The communication controller circuitry 50 may also comprise a communication mode selection circuitry 54 configured to carry out the selection of the communication mode, as described above, if it is determined that the base station selects communication modes for terminal devices in the cell. When the base station is configured to carry out the above-described power control scheme, the communication controller circuitry 50 may also comprise a power control circuitry 56 configured to carry out the selection of the transmission powers and the frequency spacing for the terminal devices. The power control circuitry may then output the frequency spacing and an identifier of the terminal device in question to the scheduler 58 so that the scheduler 58 may carry out the scheduling according to the required frequency spacing. The power control circuitry may determine the transmission power margins for the radio links from power resources received from terminal devices and/or from the power control algorithm controlling transmission powers in the cell. The circuitries 50 to 58 of the communication controller circuitry 50 may be carried out by the one or more physical circuitries or processors. In practice, the different circuitries may be realized by different computer program modules.

The apparatus may further comprise a memory 60 storing computer programs configuring the apparatus to perform the above-described functionalities of the base station. The memory 60 may also store communication parameters and other information needed for the cellular connections. The parameters and the other information may comprise the above-mentioned database(s), channel estimates, etc. The apparatus may further comprise radio interface components 70 providing the apparatus with radio communication capabilities with the radio access network. The radio interface components 70 may comprise standard well-known components such as amplifier, filter, frequency-converter, (de)modulator, and encoder/decoder circuitries and one or more antennas.

In some embodiments, the apparatus carrying out the embodiments of the invention in the base station, for example, comprises at least one processor and at least one memory including a computer program code, wherein the at least one memory and the computer program code are configured, with the at least one processor, to cause the apparatus to carry out the steps of at least one of the processes of FIGS. 2, 6, and 7 or any other embodiment described above that is carried out in the base station. In further embodiments, the at least one memory and the computer program code are configured, with the at least one processor, to cause the apparatus to carry out any one of the embodiments related to the selection of the communication mode and/or the power control scheme(s). Accordingly, the at least one processor, the memory, and the computer program code form processing means to carry out embodiments of the present invention in the base station.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described above may also be carried out in the form of a computer process defined by a computer program. The computer program may be in source code form, object code form, or in an intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units (or processor cores).

The present invention is applicable to cellular or mobile telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   acquiring, at a first terminal device, a first channel estimate related to a first radio link between a base station and the first terminal device;
   acquiring, at the first terminal device, a second channel estimate related to a second radio link between the first terminal device and a second terminal device;
   determining, at the first terminal device, a difference between the first channel estimate and a second channel estimate; and
   selecting at the first terminal device, a communication mode based on the determined difference between the first channel estimate and the second channel estimate, wherein the communication mode comprises one of a plurality of configurations to multiplex communication over the first radio link with communication over the second radio link; and
   configuring the first terminal device to apply the selected communication mode.

2. The method of claim 1, wherein the communication mode comprises one of at least:
   a restricted communication mode in which the first terminal device is configured to time-multiplex communications over the first and the second radio links and to use time-domain duplexing in the second radio link; and
   a flexible communication mode in which the first terminal device is configured to support both time-multiplex communications and frequency-multiplex communications on the first and the second radio links.

3. The method of claim 2, further comprising:
   comparing the difference between the first channel estimate and the second channel estimate with a predetermined threshold;
   selecting the restricted communication mode when the difference between the first channel estimate and the second channel estimate is higher than the threshold; and
   selecting the flexible communication mode when the difference between the first channel estimate and the second channel estimate is lower than the threshold.

4. The method of claim 2, wherein the restricted communication mode applies the time-multiplex communications such that the first terminal device communicates over one radio link at a time and in one communication direction at a time.

5. The method of claim 2, further comprising:
configuring the first terminal device to support the flexible communication mode with the first radio link using frequency-multiplex communications and the second radio link using frequency-multiplex communications.

6. The method of claim 2, wherein the flexible communication mode comprises:
selecting, at the first terminal device, the frequency-multiplex communications for the first radio link and for the second radio link;
determining a first transmission power for the first radio link and a second transmission power for the second radio link and a frequency spacing between frequency resources allocated to the first radio link and frequency resources allocated to the second radio link in a joint optimization process such that the frequency spacing between the frequency resources allocated to the first radio link and the frequency resources allocated to the second radio link is proportional to the difference between the first transmission power and the second transmission power; and
configuring the first terminal device to apply the determined transmission powers and the frequency spacing to the first radio link concurrently with the second radio link.

7. The method of claim 6, wherein the determining the first and second transmission powers and the frequency spacing comprises:
comparing the difference between the first channel estimate and the second channel estimate with at least one of a first threshold and a second threshold,
wherein when the difference between the first channel estimate and the second channel estimate indicates that a first required transmission power for the first radio link is higher than a second required transmission power for the second radio link by an amount defined by the first threshold, increasing the second transmission power for the second radio link and setting the frequency spacing to zero;
wherein when the difference between the first channel estimate and the second channel estimate indicates that the first required transmission power for the first radio link and the second required transmission power required for the second radio link is less than a predetermined value as defined by the difference between the first threshold and the second threshold, maintaining the first and second transmission power settings for the first radio link and the second radio link and setting the frequency spacing to zero; and
wherein when the difference between the first channel estimate and the second channel estimate indicates that the second required transmission power for the second radio link is higher than the first required transmission power for the first radio link by another amount defined by the second threshold, increasing the first transmission power for the first radio link and setting the frequency spacing to zero, and
wherein when a transmit power margin of the first terminal device prevents the increasing the first transmission power for the first radio link by a given amount, increasing the frequency spacing in proportion to the amount, and wherein when another transmit power margin of the first terminal device prevents the increasing the second transmission power for the second radio link by another given amount, increasing the frequency spacing in proportion to the other amount.

8. The method of claim 6, wherein the first and second transmission powers and the frequency spacing are determined before the selection of the communication mode, and wherein at least the frequency spacing is used to select the communication mode.

9. The method of claim 1, further comprising using uplink frequency resources of the base station to communicate over the second radio link, wherein the frequency resources of the base station are divided into downlink frequency resources for downlink communications and uplink frequency resources for uplink communications.

10. The method of claim 1, further comprising configuring the first terminal device to not select frequency-multiplex communications at transmission time instants when the first terminal device carries out reception over the second radio link.

11. The method of claim 1, wherein the second radio link connects a first communication device and a second communication device.

12. An apparatus comprising:
at least one processor; and
at least one memory including computer program code, the at least one memory, and the computer program code configured to cause the apparatus to at least:
acquire a first channel estimate related to a first radio link between a base station and the apparatus;
acquire a second channel estimate related to a second radio link between the the apparatus and a second terminal device;
determine a difference between the first channel estimate and a second channel estimate;
select, on the basis of the determined difference between the first channel estimate and the second channel estimate, a communication mode of the apparatus from a plurality of configurations to multiplex communication over the first radio link with communication over the second radio link; and
configure the apparatus to apply the selected communication mode.

13. The apparatus of claim 12, wherein the the communication mode comprises one of at least:
a restricted communication mode in which the apparatus is configured to time-multiplex communications over the first and the second radio links and to use time-domain duplexing in the communications over the second radio link; and
a flexible communication mode in which the apparatus is configured to support both time-multiplex communications and frequency-multiplex communications on the first and second radio links.

14. The apparatus of claim 13, further configured to
compare the difference between the first channel estimate and the second channel estimate with a predetermined threshold,
select the restricted communication mode, when the difference between the first channel estimate and the second channel estimate is higher than the predetermined threshold, and
select the flexible communication mode, when the difference between the first channel estimate and the second channel estimate is lower than the predetermined threshold.

15. The apparatus of claim 13, wherein the restricted communication mode applies the time-multiplex communications such that the apparatus communicates over one radio link at a time and in one communication direction at a time.

16. The apparatus of claim 13, further configured to support the flexible communication mode with the first radio link using frequency-multiplex communications and the second radio link using frequency-multiplex communications.

17. The apparatus of claim 13, wherein the flexible communication mode transmissions of the apparatus over the first radio link are frequency-multiplexed with transmissions of the apparatus over the second radio link, and
wherein the apparatus is further configured to determine a first transmission power for the first radio link and a second transmission power for the second radio link and a frequency spacing between frequency resources allocated to the first radio link and frequency resources allocated to the second radio link in a joint optimization process such that the frequency spacing between the frequency resources allocated to the first radio link and the frequency resources allocated to the second radio link is proportional to the difference between the first transmission power for the first radio link and the second transmission power for the second radio link, and to configure the first terminal device to apply the first and second transmission powers and the frequency spacing in the first radio link concurrently with the second radio link.

18. The apparatus of claim 17, further configured to determine the first and second transmission powers and the frequency spacing by comparing the difference between the first channel estimate and the second channel estimate with at least one of a first threshold and a second threshold,
wherein when the difference between the first channel estimate and the second channel estimate indicates that a first required transmission power for the first radio link is higher than a second required transmission power required for the second radio link by the amount defined by the first threshold, the second transmission power is increased for the second radio link and the frequency spacing is set to zero,
wherein when the difference between the first channel estimate and the second channel estimate indicates that the first required transmission power required for the first radio link and the second required transmission power required for the second radio link is less than a predetermined value as defined by the difference between the first 35 threshold and the second threshold, the first and second transmission powers are maintained for the first radio link and the second radio link and the frequency spacing is set to zero,
wherein when the difference between the first channel estimate and the second channel estimate indicates that the second required transmission power for the second radio link is higher than the first required transmission power for the first radio link by another amount defined by the second threshold, the first transmission power for the first radio link is increased and the frequency spacing is set to zero, and
wherein when a transmit power margin of the apparatus prevents increasing the first transmission power by a given amount, the frequency spacing is increased in proportion to the amount, and wherein when another transmit power margin of the apparatus prevents increasing the second transmission power for the second radio link by another given amount, increasing the frequency spacing in proportion to the other amount.

19. The apparatus of claim 17, further configured to determine the first and second transmission powers and the frequency spacing before the selection of the communication mode, and to use at least the frequency spacing to select the communication mode.

20. The apparatus of claim 12, further configured to use uplink frequency resources of the base station to communicate over the second radio link, wherein the frequency resources of the base station are divided into downlink frequency resources for downlink communications and uplink frequency resources for uplink communications.

21. The apparatus of 12, further configured to not select frequency-multiplex communications at transmission time instants when the first terminal device carries out reception over the second radio link.

22. The apparatus of claim 12, wherein the second radio link connects a first communication device and a second communication device.

23. The apparatus of claim, wherein the apparatus comprises a first terminal device, the first terminal device comprising additional radio interface components that provide a radio communication capability.

24. The apparatus of claim 12, wherein the base station comprises additional radio interface components that provide a radio communication capability.

25. A non-transitory computer-readable medium encoded with instructions that, when executed by at least one processor, perform at least the following:
acquire, at a first terminal device, a first channel estimate related to a first radio link between a base station and the first terminal device;
acquire, at the first terminal device, a second channel estimate related to a second radio link between the first terminal device and a second terminal device;
determine, at the first terminal device, a difference between the first channel estimate and a second channel estimate;
select at the first terminal device, a communication mode based on the determined difference between the first channel estimate and the second channel estimate, wherein the communication mode comprises one of a plurality of different configurations to multiplex communication over the first radio link with communication over the second radio link; and
configure the first terminal device to apply the selected communication mode.

* * * * *